(12) United States Patent
Donais et al.

(10) Patent No.: US 10,399,881 B2
(45) Date of Patent: Sep. 3, 2019

(54) METHODS AND SYSTEMS FOR SEPARATING SOLID PARTICULATES FROM WASTE WATER

(71) Applicant: General Electric Company, Schenectady, NY (US)

(72) Inventors: Robert Theodore Donais, Windsor, CT (US); Harvey Kent Dunning, Cromwell, CT (US)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 15/379,162

(22) Filed: Dec. 14, 2016

(65) Prior Publication Data

US 2018/0162760 A1 Jun. 14, 2018

(51) Int. Cl.
| | | |
|---|---|---|
| C02F 1/00 | (2006.01) | |
| C02F 1/34 | (2006.01) | |
| C02F 1/38 | (2006.01) | |
| C02F 9/00 | (2006.01) | |
| C02F 11/121 | (2019.01) | |
| C02F 103/02 | (2006.01) | |
| C02F 103/18 | (2006.01) | |

(52) U.S. Cl.
CPC .............. *C02F 11/121* (2013.01); *C02F 1/34* (2013.01); *C02F 1/38* (2013.01); *C02F 9/00* (2013.01); *C02F 2001/007* (2013.01); *C02F 2103/023* (2013.01); *C02F 2103/18* (2013.01); *C02F 2209/01* (2013.01); *C02F 2301/08* (2013.01); *C02F 2303/24* (2013.01)

(58) Field of Classification Search
None
See application file for complete search history.

(56) References Cited

U.S. PATENT DOCUMENTS

| | | | | |
|---|---|---|---|---|
| 4,234,413 A | * | 11/1980 | Summers ........... | B01D 21/0012 209/17 |
| 4,303,526 A | * | 12/1981 | Moro .................. | B03B 9/06 209/726 |
| 4,470,901 A | * | 9/1984 | Burgess ............... | B03B 13/005 209/1 |
| 4,541,933 A | * | 9/1985 | Arnold ............... | B01D 21/0012 210/780 |
| 5,582,727 A | * | 12/1996 | Foster ................ | B01D 21/267 209/322 |
| 5,656,174 A | * | 8/1997 | Hodges .............. | B01D 29/01 210/705 |
| 7,074,339 B1 | | 7/2006 | Mims | |

(Continued)

FOREIGN PATENT DOCUMENTS

WO 2016115453 A1 7/2016

*Primary Examiner* — David C Mellon
(74) *Attorney, Agent, or Firm* — Armstrong Teasdale LLP

(57) ABSTRACT

A method for separating solid particulates from waste water includes receiving a first stream of waste water, and adjusting a specific gravity of the received waste water to within a pre-selected range. The method also includes channeling the adjusted waste water to a first hydro-cyclone system. The first hydro-cyclone system separates a first portion of solid particulates from the adjusted waste water. The method further includes transferring the first portion of solid particulates to a vibrating dewatering screen. The vibrating dewatering screen separates residual water from the first portion of solid particulates.

15 Claims, 3 Drawing Sheets

(56) References Cited

U.S. PATENT DOCUMENTS

| | | |
|---|---|---|
| 9,345,992 B2 | 5/2016 | Little et al. |
| 2005/0040119 A1* | 2/2005 | Kulbeth ............ B01D 21/0045 |
| | | 210/806 |
| 2007/0180741 A1 | 8/2007 | Bjornson et al. |
| 2007/0289911 A1 | 12/2007 | Cymerman et al. |
| 2008/0121493 A1 | 5/2008 | Bjornson et al. |
| 2010/0170425 A1 | 7/2010 | Magaldi |
| 2011/0226194 A1 | 9/2011 | Mooney |
| 2013/0092619 A1* | 4/2013 | Bagnoli .................... B09C 1/00 |
| | | 210/324 |

* cited by examiner

METHODS AND SYSTEMS FOR SEPARATING SOLID PARTICULATES FROM WASTE WATER

BACKGROUND

The present disclosure relates generally to waste water treatment and, more particularly, to systems and methods for removing solid particulates from waste water allowing for water recovery and re-use.

At least some known boiler systems include bottom ash systems that use water to cool and transport bottom ash from the boiler to an ash pond for disposal. Generally, bottom ash is the non-combustible coal residue from burned fuel. In at least some such systems, the water used to transport the ash is delivered contaminated with solids to the ash pond where the solids are allowed to settle and accumulate. Water is also used in at least some known boiler systems to carry pyrites, economizer ash, and reacted air pollution control reagents used for removal of sulfur from flue gases. Solid particulates are collected in filters that are periodically backwashed to clean out the accumulated filtered material. In at least some known systems, the backwash and filtered materials are typically released to a settling pond as waste sludge. When such waste sludge is accumulated and stored in ash ponds, the potentially toxic constituents may be released by the pond water into the bottom soil and pond run-off. Particulates in the environment or other waste streams may mix and combine with it, making the waste sludge non-suitable for reuse.

Known bottom ash dewatering systems are time-consuming, generally take between four to six hours to handle customary solids, and typically rely on gravity to separate particulates from water. In an effort to speed up the process, at least some facilities use additional separation equipment, such as but not limited to hydro-cyclones. However, the use of such equipment may be limited depending on the characteristics of the waste water.

BRIEF SUMMARY

In one embodiment, a method for separating solid particulates from waste water is provided. The method includes receiving a first stream of waste water, and adjusting a specific gravity of the received waste water to within a pre-selected range. The method also includes channeling the adjusted waste water to a first hydro-cyclone system. The first hydro-cyclone system separates a first portion of solid particulates from the adjusted waste water. The method further includes transferring the first portion of solid particulates to a vibrating dewatering screen. The vibrating dewatering screen separates residual water from the first portion of solid particulates.

In another embodiment, a system for separating solid particulates from waste water is provided. The system includes a first feed tank configured to receive a first stream of waste water, and an adjustment water input coupled in flow communication with the first feed tank. The adjustment water input is controllable to selectively add water to the received waste water, such that a specific gravity of the received waste water is adjusted to within a pre-selected range. The system also includes a first hydro-cyclone system coupled downstream from the first feed tank. The first hydro-cyclone system is configured to separate a first portion of solid particulates from the adjusted waste water. The system further includes a vibrating dewatering screen configured to receive the first portion of solid particulates thereon, and to separate residual water from the first portion of solid particulates.

In another embodiment, a method for separating solid particulates from waste water is provided. The method includes receiving waste water at a first hydro-cyclone system. The first hydro-cyclone system separates a first portion of solid particulates from the waste water. The method also includes receiving the first portion of solid particulates at a first end of a vibrating dewatering screen, and channeling the waste water, after separation of the first portion of solid particulates, to a second hydro-cyclone system. The second hydro-cyclone system separates a second portion of solid particulates from the waste water. The method further includes receiving the second portion of solid particulates at a central portion of the vibrating dewatering screen. The vibrating dewatering screen separates residual water at least partially concurrently from the first and second portions of solid particulates.

DETAILED DESCRIPTION

Embodiments of the present disclosure include a vibrating dewatering screen configured to dewater a first portion of solids separated by a first hydro-cyclone system. Some embodiments include an adjustment water input configured to adjust a specific gravity of the waste water to be compatible with efficient operation of the first hydro-cyclone system. Certain embodiments include a second hydro-cyclone system from which a second portion of solids separated from the waste water are deposited on a central portion of the vibrating dewatering screen, facilitating an improved efficiency of the overall dewatering process. The implementation of the embodiments of the above-described system and method facilitates a minimal use of turbulence, time, and gravity for separating solid particulates from waste water. As such, the embodiments of the above-described system and method enable a highly controlled separation of solid particulates from waste water in reduced time.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
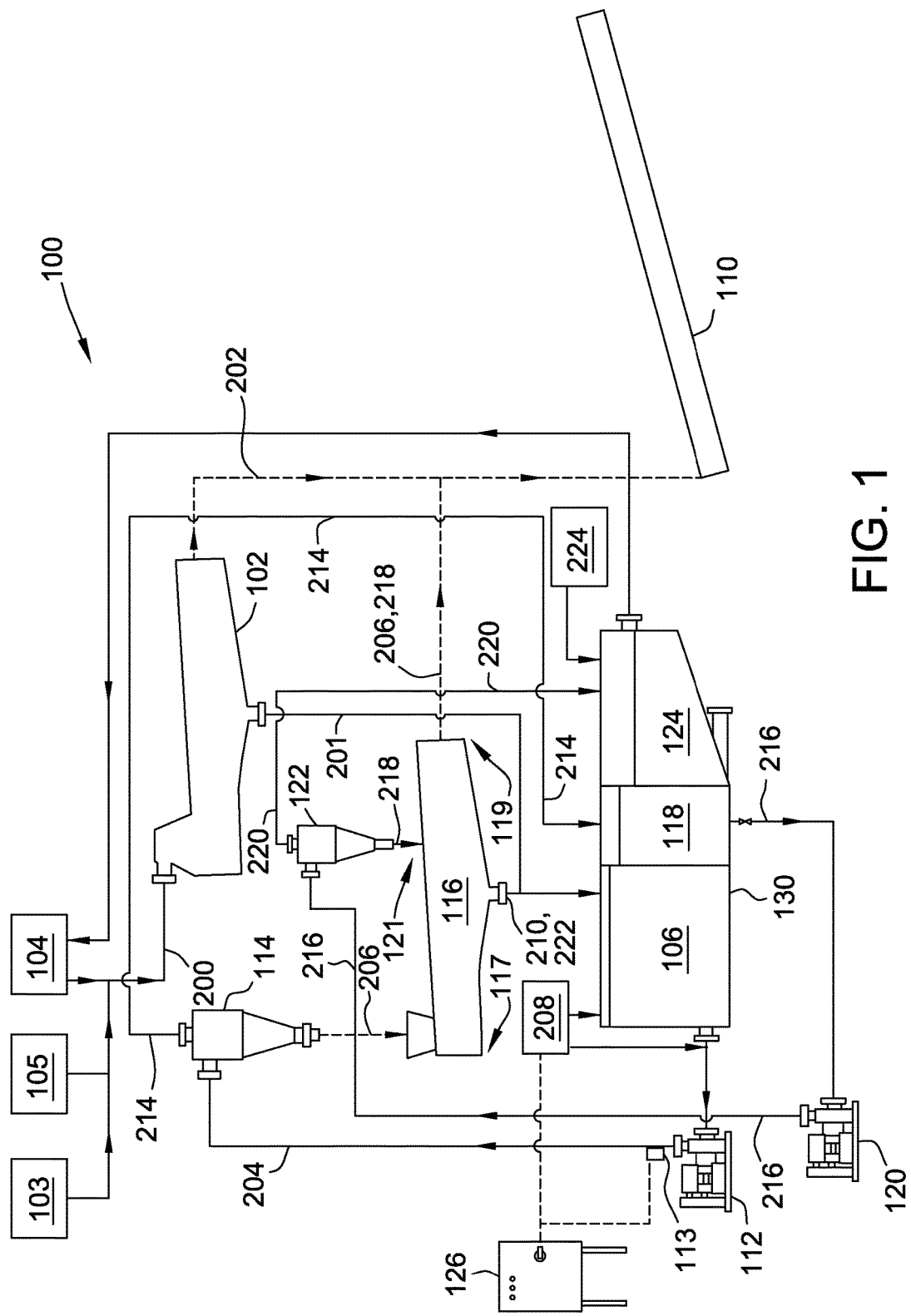
FIG. 1 is a schematic illustration of an exemplary system for use in separating solid particulates from waste water.

FIG. 1 is a schematic illustration of an exemplary system 100 that may be used to separate solid particulates from waste water. In the exemplary embodiment, system 100 receives raw waste water 200 from at least one bottom boiler ash installation 103. Additionally or alternatively, system 100 may receive raw waste water 200 from at least one disposal waste water structure 104 (e.g., an ash pond) and/or from at least one bottom ash storage bin 105. Although embodiments of the present disclosure are described below in the context of bottom boiler ash installation 103, disposal waste water structure 104, and bottom ash storage bin 105, it should be understood that embodiments of the present disclosure are envisioned for use in any suitable system in which separation of solid particulates from waste water is desired.

In the exemplary embodiment, system 100 receives raw waste water 200 at a vibrating solids scalper 102. Vibrating solids scalper 102 includes sizing screens that initially separate oversized solids 202, including thermally fused materials, from raw waste water 200 received. For example, but not by way of limitation, in the exemplary embodiment, vibrating solids scalper 102 separates particles having a size greater than or equal to about 0.375 inches. Oversized solids 202 are transferred to an ash conveyor 110 that is coupled downstream from, and in flow communication with, vibrating solids scalper 102. First stream 201 of waste water, from which oversized solids 202 have been removed, is channeled from vibrating solids scalper 102 to a first feed tank 106 that is coupled downstream from, and in flow communication with, vibrating solids scalper 102. It should be noted that, as used herein, the term "couple" is not limited to a direct mechanical, electrical, and/or communication connection between components, but may also include an indirect mechanical, electrical, and/or communication connection between multiple components. In alternative embodiments, system 100 does not include vibrating solids scalper 102. For example, raw waste water 200 may be delivered directly as first stream 201 to first feed tank 106.

In the exemplary embodiment, a first slurry transfer pump 112 is coupled downstream from, and in flow communication with, first feed tank 106, and a first hydro-cyclone system 114 is coupled downstream from, and in flow communication with, first slurry transfer pump 112. More specifically, first slurry transfer pump 112 pumps waste water from first feed tank 106 and channels a second stream 204 of waste water to first hydro-cyclone system 114. In alternative embodiments, second stream 204 of waste water is channeled from first feed tank 106 to first hydro-cyclone system 114 in any suitable fashion.

First hydro-cyclone system 114 includes at least one suitable hydro-cyclone unit (not shown) that separates a first portion 206 of solid particulates from second stream 204 of waste water. For example, first hydro-cyclone system 114 is sized to separate a selected, relatively large size range of solid particulates, as compared to a second hydro-cyclone system 122, described in more detail below. In the exemplary embodiment, first hydro-cyclone system 114 includes a plurality (not shown) of hydro-cyclone units arranged in parallel, with subsets of hydro-cyclone units alternately working or in operational stand-by mode.

In some embodiments, first stream 201 of waste water received at first feed tank 106 has a consistency that is not compatible with efficient operation of first hydro-cyclone system 114. For example, in the exemplary embodiment, first hydro-cyclone system 114 operates most efficiently over a relatively narrow range of specific gravity of received fluid, and first stream 201 of waste water received at first feed tank 106 has a consistency that varies over a relatively wide range. In such an example, a specific gravity of first stream 201 could inhibit first hydro-cyclone system 114 from separating the selected size range of solid particulates from first portion 206, and/or could cause clogging of first hydro-cyclone system 114, thus increasing the frequency of cleaning of first hydro-cyclone system 114 and/or resulting in decreased operational time and efficiency of operation.

As such, in some embodiments, system 100 includes an adjustment water input 208 coupled in flow communication with first feed tank 106. Adjustment water input 208 is controllable to selectively add water to the waste water in first feed tank 106 to facilitate adjusting a specific gravity of second stream 204 of waste water to within a pre-selected range. More specifically, the range is pre-selected to be compatible with efficient operation of first hydro-cyclone system 114. Controllable adjustment water input 208 thus facilitates increasing a speed and efficiency of processing raw waste water 200 through system 100.

In the exemplary embodiment, adjustment water input 208 is coupled directly to first feed tank 106. Additionally or alternatively, adjustment water input 208 is directly coupled to a suction connection between first feed tank 106 and first slurry transfer pump 112. In alternative embodiments, adjustment feed water 208 is coupled in any suitable location that enables adjustment of the specific gravity of second stream 204 of waste water as described herein.

In some embodiments, the pre-selected range of specific gravity of second stream 204 of waste water is adjusted to be less than or equal to about 1.2. In some such embodiments, the pre-selected range of specific gravity after addition of adjustment water 208 is between about 1.10 and to about 1.15. In alternative embodiments, adjustment water input 208 is controllable to add water to obtain any suitable specific gravity for second stream 204 of waste water that enables system 100 to function as described herein, such as greater than 1.2 and/or less than 1.10. In other alternative embodiments, system 100 does not include controllable adjustment water input 208.

In certain embodiments, adjustment water input 208 is operatively coupled to, and automatically controlled by, a suitable controller 126. For example, controller 126 is operatively coupled to a suitable sensor 113 configured to measure the specific gravity of the waste water channeled from first slurry transfer pump 112. Controller 126 automatically operates adjustment water input 208 based on feedback from sensor 113 to adjust the specific gravity of second stream 204 of waste water to within the preselected range. In alternative embodiments, sensor 113 is positioned at any suitable location, such as within first feed tank 106. Additionally or alternatively, adjustment water input 208 is manually controllable, such as by an operator of system 100.

After first portion 206 of solid particulates is separated in first hydro-cyclone system 114, first portion 206 is deposited at first end 117 of a vibrating dewatering screen 116. Vibrating dewatering screen 116 separates residual water 210 from first portion 206 of solid particulates. For example, in one embodiment, vibrating dewatering screen 116 is a model BXHM-3616 heavy duty inclined vibrating screen commercially available from Deister® Machine Company of Fort Wayne, Ind. In alternative embodiments, vibrating dewatering screen 116 is any other suitable vibrating screen that enables system 100 to function as described herein. Dewatered first portion 206 of solid particulates ejected from second end 119 of vibrating dewatering screen 116 is deposited on an ash conveyor 110. For example, dewatered first portion 206 of solid particulates is conveyed to a suitable ash handling facility.

In the exemplary embodiment, residual water 210 from vibrating dewatering screen 116 is channeled to first feed tank 106 for re-processing through system 100. In alternative embodiments, residual water 210 may be channeled to any suitable repository that enables system 100 to function as described herein, such as for storage and subsequent return to the facility for re-use in the ash transport service.

Second stream 204 of adjusted waste water, after first portion 206 of solid particulates is removed, is ejected from first hydro-cyclone system 114 as third stream 214 of waste water. Third stream 214 of waste water is channeled to a second feed tank 118. In the exemplary embodiment, a second slurry transfer pump 120 is coupled downstream from, and in flow communication with, second feed tank 118, and a second hydro-cyclone system 122 is coupled downstream from, and in flow communication with, second slurry transfer pump 120. More specifically, second slurry transfer pump 120 pumps fourth stream 216 of waste water from second feed tank 118 to second hydro-cyclone system 122. In alternative embodiments, fourth stream 216 of waste water is channeled from second feed tank 118 to second hydro-cyclone system 122 in any suitable fashion.

Similar to first hydro-cyclone system 114, second hydro-cyclone system 122 includes at least one suitable hydro-cyclone unit that separates a second portion 218 of solid particulates from fourth stream 216 of waste water. For example, second hydro-cyclone system 122 is sized to separate a selected, relatively fine size range of solid particulates as second portion 218, as compared to first portion 206 separated by first hydro-cyclone system 114 described above. In the exemplary embodiment, second hydro-cyclone system 122 also includes a plurality (not shown) of hydro-cyclone units arranged in parallel, with subsets of hydro-cyclone units alternately working or in operational stand-by mode.

In some embodiments, another controllable adjustment water input (not shown) similar to controllable adjustment water input 208 is coupled in flow communication with second feed tank 118. For example, third stream 214 of waste water received at second feed tank 118 has a consistency that may not be compatible with efficient operation of second hydro-cyclone system 122. As such, adjustment water is input to adjust a specific gravity of fourth stream 216 of waste water to within a pre-selected range, similar to the process described above for controllable adjustment water input 208 and second stream 204 of waste water. In alternative embodiments, system 100 does not adjust a specific gravity of fourth stream 216 of waste water.

Fourth stream 216 of waste water, after second portion 218 of solid particulates is removed, is ejected from second hydro-cyclone system 122 as fifth stream 220 of waste water. In the exemplary embodiment, fifth stream 220 of waste water is channeled to a recycle holding tank 124. In the exemplary embodiment, fifth stream 220 of waste water includes only ultra-light suspended solids. In some embodiments, water from recycling holding tank 124 is transported to waste water structure 104, such as an ash pond, for storage and recovery. Additionally or alternatively, at least a portion of the water from recycle holding tank 124 is used for system 100 processes and/or flushing applications. Additionally or alternatively, water from recycle holding tank 124 may be handled in any other suitable fashion, such as for re-use in the bottom ash transport system.

After second portion 218 of solid particulates is separated in second hydro-cyclone system 122, second portion 218 of solid particulates is deposited on vibrating dewatering screen 116. Vibrating dewatering screen 116 separates residual water 222 from second portion 218 of solid particulates at least partially concurrently with separating residual water 210 from first portion 206 of solid particulates. Dewatered second portion 218 ejected from second end 119 of vibrating dewatering screen 116 is deposited on ash conveyor 110 with dewatered first portion 206 of solid particulates, and ash conveyor 110 conveys dewatered second portion 218 along with dewatered first portion 206 to a suitable ash handling facility. In the exemplary embodiment, residual water 222 from vibrating dewatering screen 116 is channeled to first feed tank 106 with residual water 210 for re-processing through system 100. In alternative embodiments, residual water 222 may be channeled to any suitable repository that enables system 100 to function as described herein.

In some embodiments, second portion 218 of solid particulates is deposited on a central portion 121 of vibrating dewatering screen 116, rather than adjacent first end 117. Second portion 218 contains relatively finer solid particulates, as compared to solid particulates in first portion 206. More specifically, it has been discovered that in some embodiments, depositing second portion 218 on central portion 121 of vibrating dewatering screen 116 facilitates improving an overall dewatering capability of vibrating dewatering screen 116. For example, in one embodiment, second portion 218 of solid particulates is deposited on central portion 121 at a location that is beyond about 50 percent of a distance between first end 117 and second end 119 to facilitate improving the dewatering capability of vibrating dewatering screen 116. In particular, in the exemplary embodiment, system 100 deposits second portion 218 of solid particulates at a location relative to central portion 121 that is within a range of about 60 percent to about 80 percent of a distance between first end 117 and second end 119. Such a deposit location relative to first end 117 and second end 119 facilitates improving elutriation of particles on the remaining length of vibrating dewatering screen 116. Moreover, deposition of second portion 218 of solid particulates on central portion 121 also facilitates increasing a speed and efficiency of processing raw waste water 200 through system 100.

In alternative embodiments, second portion 218 of solid particulates is deposited on any suitable portion of vibrating dewatering screen 116, including adjacent first end 117, that enables system 100 to function as described herein. In other alternative embodiments, second portion 218 of solid particulates is not deposited on vibrating dewatering screen 116, but rather is handled in any suitable fashion that enables system 100 to function as described herein. In still other alternative embodiments, system 100 does not include second hydro-cyclone system 122.

In certain embodiments, make-up water 224 is added to the system, such as to supplement water lost to solids entrainment and to replace evaporation in the wet bottom. In the exemplary embodiment, make-up water 224 is added to recycle holding tank 124. In an alternative embodiment, make-up water 224 is added at any suitable location that enables system 100 to function as described herein. In some embodiments, due to the water lost to solids entrainment and to replace evaporation in the wet bottom, system 100 may operate at approximately 30 cycles of concentration. Additionally, a separate slip stream may be directed through a media filtration section in bottom ash storage bin 105. The separate slip stream may also be reclaimed to recycle holding tank 124. For example, based on a 2,000 gallon-per-minute flow rate of raw waste water 200 with a solids specific gravity in the operational range, a loss of water to "solids entrainment" may be estimated to be 15% to 30% by weight, corresponding to an approximate reclaimed water rate of between 1,400 to 1,700 gallons per minute.

In the exemplary embodiment, an enclosure 130 at least partially encloses first feed tank 106, second feed tank 118, and recycle holding tank 124. In alternative embodiments, first feed tank 106, second feed tank 118, and recycle holding tank 124 may not be enclosed in the same enclosure.

Figure 2:
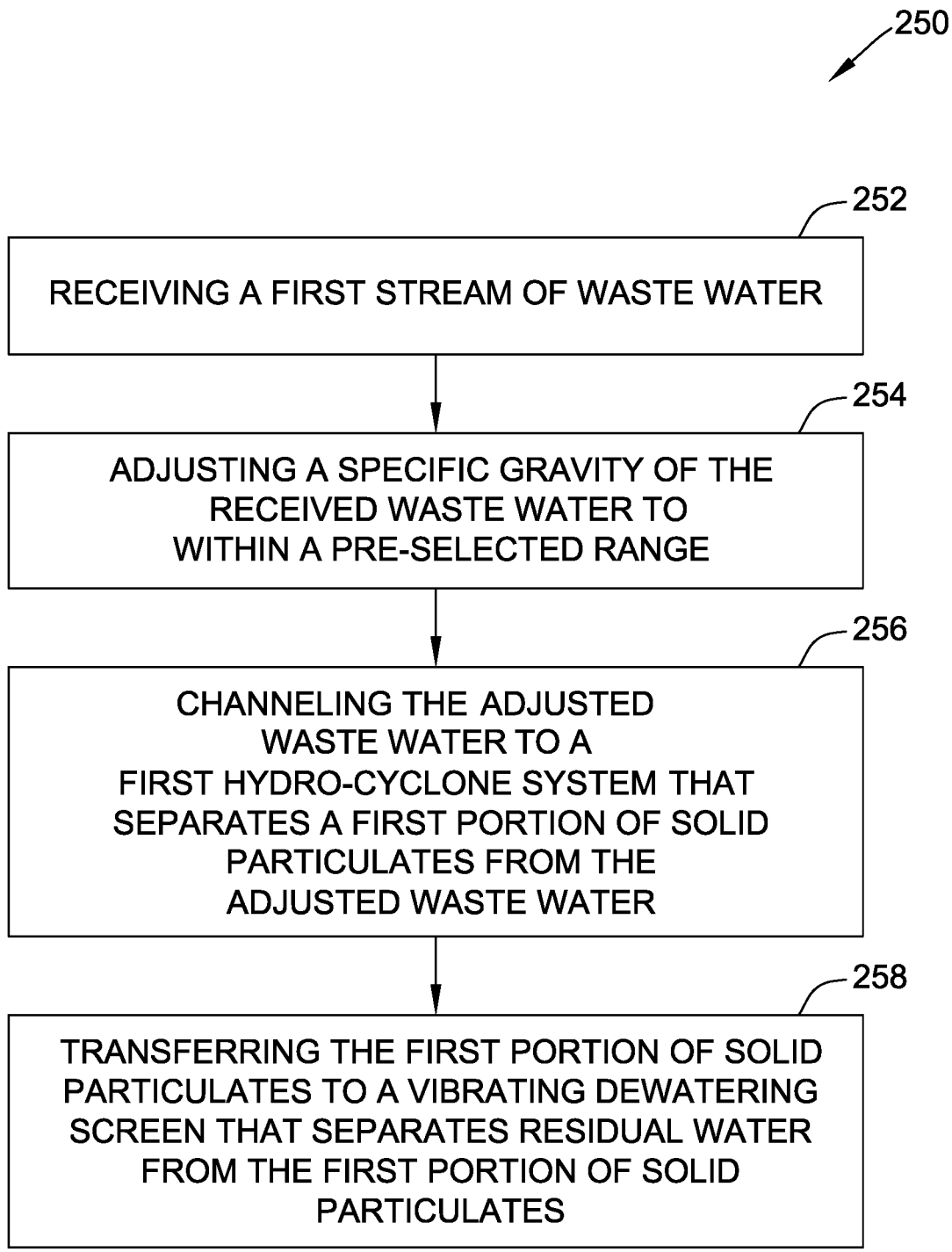
FIG. 2 is a flow diagram of an exemplary method for separating solid particulates from waste water.

FIG. 2 is a flow diagram of an exemplary method 250 for separating solid particulates from waste water, such as using system 100. With reference to FIG. 1, the exemplary method 250 includes receiving 252 a first stream of waste water, such as first stream 201 of waste water, and adjusting 254 a specific gravity of the received waste water to within a pre-selected range. Method 250 also includes channeling 256 the adjusted waste water to first hydro-cyclone system 114 that separates first portion 206 of solid particulates from the adjusted waste water. Method 250 further includes transferring 258 the first portion 206 of solid particulates to a vibrating dewatering screen 116 that separates residual water from the first portion 206 of solid particulates.

Figure 3:
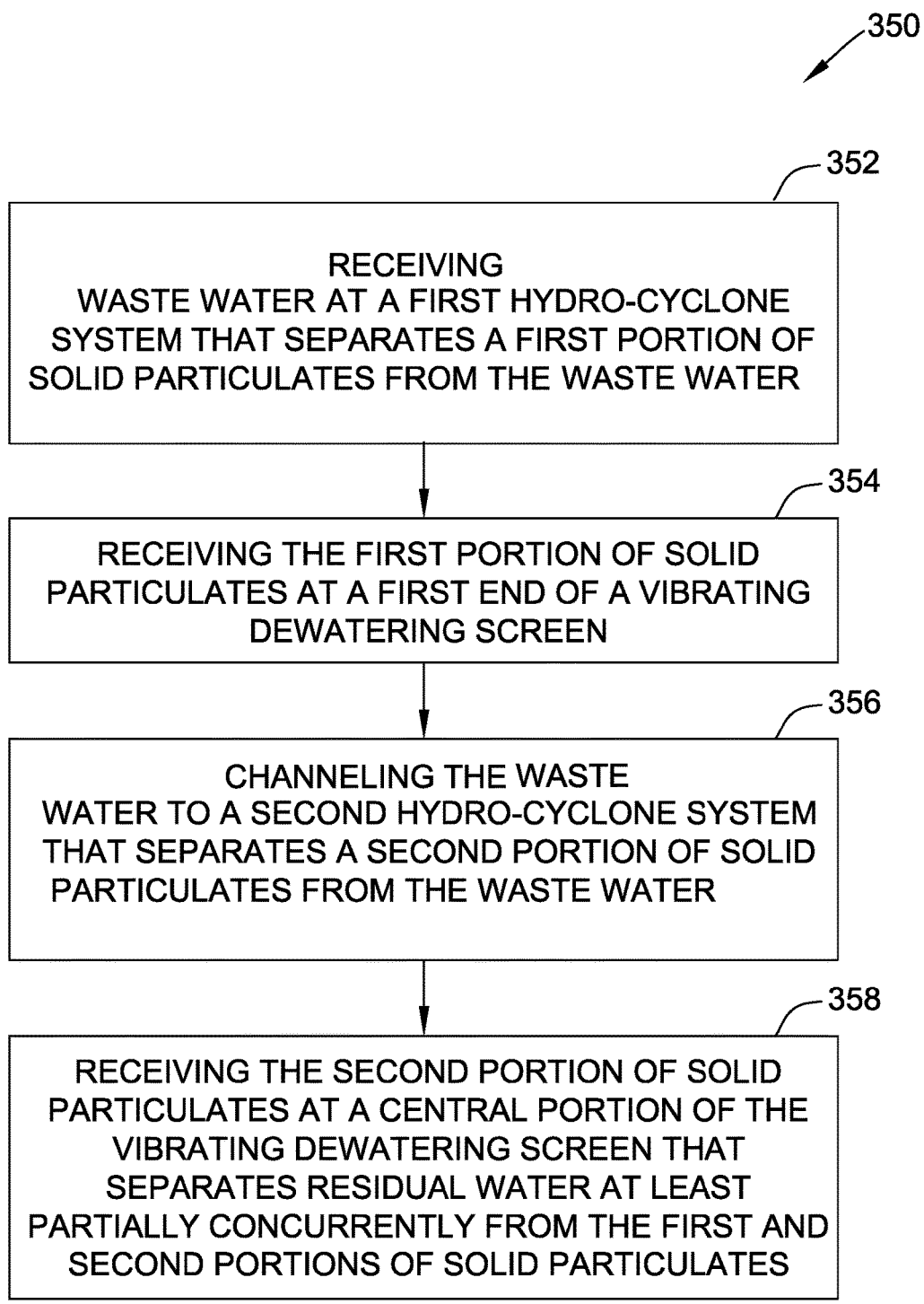
FIG. 3 is a flow diagram of another exemplary method that may be implemented to separate solid particulates from waste water.

FIG. 3 is a flow diagram of another method 350 for separating solid particulates from waste water, such as using system 100. With reference to FIG. 1, method 350 includes receiving 352 waste water, such as second stream 204 of waste water, at a first hydro-cyclone system 114 that separates a first portion 206 of solid particulates from the waste water. Method 350 also includes receiving 354 first portion 206 of solid particulates at first end 117 of vibrating dewatering screen 116, and channeling 356 the waste water, after separation of first portion 206 of solid particulates, to second hydro-cyclone system 122 that separates second portion 218 of solid particulates from the waste water. Method 350 further includes receiving 358 second portion 218 of solid particulates at central portion 121 of the vibrating dewatering screen 116 that separates residual water at least partially concurrently from first portion 206 and second portion 218 of solid particulates.

Embodiments of the above-described system and method for separating solid particulates from waste water provide an advantage over at least some known systems for use in separating solid particulates from waste water. Specifically, the embodiments include a vibrating dewatering screen configured to dewater a first portion of solids separated by a first hydro-cyclone system. Also specifically, some embodiments include an adjustment water input configured to adjust a specific gravity of the waste water to be compatible with efficient operation of the first hydro-cyclone system. Also specifically, certain embodiments include a second hydro-cyclone system from which a second portion of solids separated from the waste water are deposited on a central portion of the vibrating dewatering screen, facilitating an improved efficiency of the overall dewatering process. The implementation of the embodiments of the above-described system and method facilitates a reduced use of turbulence, time, and gravity for separating solid particulates from waste water. As such, the embodiments of the above-described system and method enable a highly controlled separation of solid particulates from waste water in reduced time. More specifically, the embodiments reduce a time required to separate solid particulates from a given volume of waste water using vibrating dewatering screen technology, while increasing separation efficiency via specific gravity adjustment of waste water prior to processing and/or via injection of relatively finer solid particulates at a central portion of a vibrating dewatering screen. Additionally, the embodiments of the above-described system and method facilitate increasing the re-circulation of waste water to the system, and handling waste water from different sources (e.g., bottom boiler installations and ash ponds) via the same system.

An exemplary technical effect of the methods, systems, and apparatus described herein includes at least one of: (a) adjusting a specific gravity of received waste water to within a pre-selected range; (b) channeling the adjusted waste water to a first hydro-cyclone system that separates a first portion of solid particulates from the adjusted waste water; (c) transferring the first portion of solid particulates to a first end of a vibrating dewatering screen that separates residual water from the first portion of solid particulates; (d) channeling waste water to a second hydro-cyclone system that separates a second portion of solid particulates from the waste water; and (e) receiving the second portion of solid particulates at a central portion of the vibrating dewatering screen that separates residual water at least partially concurrently from the first and second portions of solid particulates.

Exemplary embodiments of methods and systems for separating solid particulates from waste water are described above in detail. The methods and systems are not limited to the specific embodiments described herein, but rather, components of systems and/or steps of the methods may be utilized independently and separately from other components and/or steps described herein. For example, the methods and/or systems may also be used in combination with other waste water processing systems and/or methods, and are not limited to practice with only the bottom boiler ash installation, disposal waste water structure, and/or bottom ash storage bin as described herein. Rather, the exemplary embodiments can be implemented and utilized in connection with many other water processing applications.

Although specific features of various embodiments of the invention may be shown in some drawings and not in others, this is for convenience only. In accordance with the principles of the invention, any feature of a drawing may be referenced and/or claimed in combination with any feature of any other drawing.

While the methods and systems described herein have been described in terms of various specific embodiments, those skilled in the art will recognize that the methods and systems described herein can be practiced with modification within the spirit and scope of the claims.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for separating solid particulates from waste water, said method comprising:
   receiving a first stream of waste water;
   adjusting a specific gravity of the received waste water to within a pre-selected range;
   channeling the adjusted waste water to a first hydro-cyclone system, wherein the first hydro-cyclone system separates a first portion of solid particulates from the adjusted waste water; and
   transferring the first portion of solid particulates to a vibrating dewatering screen, wherein the vibrating dewatering screen separates residual water from the first portion of solid particulates.

2. The method of claim 1, wherein said adjusting the specific gravity comprises adjusting the specific gravity to between about 1.1 and about 1.2.

3. The method of claim 1, further comprising, after the first portion of solid particulates is removed from the adjusted waste water, channeling the adjusted waste water to a second hydro-cyclone system, wherein the second hydro-cyclone system separates a second portion of solid particulates from the adjusted waste water.

4. The method of claim 3, further comprising, after the second portion of solid particulates is removed from the adjusted waste water:
   channeling the adjusted waste water to a recycle water holding tank; and
   using at least a portion of the adjusted waste water from the recycle holding tank for at least one of system processes and flushing applications.

5. The method of claim 3, further comprising transferring the second portion of solid particulates to the vibrating dewatering screen, wherein the vibrating dewatering screen separates residual water from the second portion of solid particulates.

6. The method of claim 5, wherein said transferring the second portion of solid particulates comprises transferring the second portion of solid particulates to a central portion of the vibrating dewatering screen, wherein the vibrating dewatering screen separates residual water at least partially concurrently from the first and second portions of solid particulates.

7. The method of claim 1, further comprising receiving raw waste water at a vibrating solids scalper, wherein the vibrating solids scalper separates oversized solids from the raw waste water to form the first stream of waste water.

8. The method of claim 1, wherein receiving the first stream of waste water comprises receiving the first stream of waste water from at least one of a bottom boiler ash installation, a disposal waste water structure, and a bottom ash storage bin.

9. A method for separating solid particulates from waste water, said method comprising:
   receiving waste water at a first hydro-cyclone system, wherein the first hydro-cyclone system separates a first portion of solid particulates from the waste water;
   receiving the first portion of solid particulates at a first end of a vibrating dewatering screen;
   channeling the waste water, after separation of the first portion of solid particulates, to a second hydro-cyclone system, wherein the second hydro-cyclone system separates a second portion of solid particulates from the waste water; and
   receiving the second portion of solid particulates at a central portion of the vibrating dewatering screen, wherein the vibrating dewatering screen separates residual water at least partially concurrently from the first and second portions of solid particulates.

10. The method of claim 9, wherein a stream of waste water is discharged from the vibrating dewatering screen after the second portion of solid particulates is removed therefrom, the method further comprising:
    channeling the waste water, after separation of the second portion of solid particulates, to a recycle water holding tank; and
    using at least a portion of the waste water received at the recycle holding tank for at least one of system process and flushing applications.

11. The method of claim 9, further comprising:
    receiving a first stream of waste water at a first feed tank; and
    channeling the waste water from the first feed tank to the first hydro-cyclone system.

12. The method of claim 11, further comprising, prior to receiving the waste water at the first hydro-cyclone system, adjusting a specific gravity of the waste water channeled to the first hydro-cyclone system to within a pre-selected range.

13. The method of claim 12, wherein said adjusting the specific gravity comprises adjusting the specific gravity of the waste water to between about 1.1 and about 1.2.

14. The method of claim 11, further comprising:
    receiving raw waste water at a vibrating solids scalper, wherein the vibrating solids scalper separates oversized solids from the raw waste water; and
    receiving the raw waste water, after the oversized solids are removed therefrom, as the first stream of waste water.

15. The method of claim 14, wherein receiving the raw waste water comprises receiving the raw waste water from at least one of a bottom boiler ash installation, a disposal waste water structure, and a bottom ash storage bin.

* * * * *